United States Patent [19]

Muse

[11] Patent Number: 5,640,797
[45] Date of Patent: Jun. 24, 1997

[54] METHOD FOR TYING ARTIFICIAL FISH EGG LURES AND DEVICE THEREOF

[76] Inventor: Curt Muse, 1150 Freedom Way, Wasilla, Ak. 99654

[21] Appl. No.: 423,278

[22] Filed: Apr. 17, 1995

[51] Int. Cl.$^6$ .................................................. A01K 97/26
[52] U.S. Cl. ........................... 43/42.53; 43/42.25
[58] Field of Search ........................ 43/1, 4, 42.25, 43/42.53, 42.37, 57.1; 242/7.19, 1.1 A, 7.01; 289/17; 223/99, 104

[56] References Cited

U.S. PATENT DOCUMENTS

| | | | |
|---|---|---|---|
| 1,953,692 | 4/1934 | Shoff | 43/42.37 |
| 2,479,710 | 8/1949 | Arnold | 242/140 |
| 2,533,523 | 12/1950 | Sivey et al. | 43/42.53 |
| 3,690,028 | 9/1972 | Walker | 43/42.53 |
| 4,103,631 | 8/1978 | Gray | 112/80 |
| 4,189,111 | 2/1980 | Doiron | 242/140 |
| 5,405,352 | 4/1995 | Weston | 606/148 |

OTHER PUBLICATIONS

Bass Pro Shops 1990 Catalog, Fly-tying Tools from Hank Roberts, Item 274–867, p. 117, 1990.

*Primary Examiner*—Jeanne Elpel
*Attorney, Agent, or Firm*—Michael J. Tavella

[57] ABSTRACT

A device and method for tying artificial fish egg lures. The device has two parts a tapered tube (which comes in different sizes to match the preferred sizes of flies), and a long thin hook tool. These two tools are used with ordinary fly tying yarn, hooks, a fly tying vice, thread, and glue to produce egg style fishing flies. Several sizes of tube can be made to fit various sizes of egg fly desired. The device is used with standard fly tying tools and supplies. Yarn is inserted into the tube and extracted using the hook tool. The tube can then be used to place and hold the yarn on a fishing hook so that the lure can be tied. Using the tube makes tying this style of flies easy and fast.

2 Claims, 4 Drawing Sheets

METHOD FOR TYING ARTIFICIAL FISH EGG LURES AND DEVICE THEREOF

This invention relates to artificial flies for fishing and particularly to devices for tying artificial egg style flies.

BACKGROUND OF THE INVENTION

Fly tying-the creation of artificial lures by tying bits of fur, cloth and other materials to a fishing hook-is an expanding hobby for thousands of people. Although such fishing lures are commonly called "flies", most of the lures simulate many other species from mosquitoes to spiders, frogs, mice and small fish. One particular style of fly simulates a clump of fish eggs. These type flies are typically called "eggs". Tying an egg fly is difficult because of the size and shape of the material being tied to the hook. There is no easy way to hold the egg material with tweezers or fingers and tie a good looking fly.

SUMMARY OF THE INVENTION

The instant invention eliminates the difficulty of tying the "egg" style flies, while still preserving the enjoyment of creating a fly. All of the creative steps in tying the fly remain. However, present invention allows the person tying the fly to hold the material to allow for a perfect or near perfect fly every time one is made.

The instant invention has two parts a tapered tube (which comes in different sizes to match the preferred sizes of flies), and a long thin hook tool. These two tools are used with ordinary fly tying yarn, hooks, a fly tying vice, thread, and glue to produce the egg flies.

As mentioned above, several sizes of tube can be made to fit various sizes of egg fly desired. The device is used during a typical fly tying session. To use the tool, the user mounts an appropriate sized hook into a fly tying vise. The hook is then prepared with thread in the usually manner for tying flies.

The tapered tube is loaded with yarn from the wide end. First, the yarn is folded in half. Next, the hook tool is pushed into the tip of the tube until it exits the tube at the wide end. The folded yarn is placed on the hook tool, which is then pulled back through the tip with the folded yarn until a sufficient quantity of yarn for the lure extends from the tip. The yarn protruding from the tip is then cut back to a point about ¼ to ⅜ inches from the tip of the tube. The end of the tube is then placed over the thread. The yarn is then secured to the hook with two wraps of thread, which is then tightened. Two additional wraps of thread are made in front of the yarn to hold the tension on the thread. The next step is to pull back on the tube while holding the yarn on the hook. The tube is pulled back between ⅜ and ½ inches. Next, the yarn is cut at a point halfway between the tip of the tube and the thread. While holding the yarn the thread is unwrapped from the shank of the hook and re tightened. The egg is secured to the hook with two figures "8" patterns formed on the bottom of the egg pattern against the shank. Finally, the thread is secured with two half hitches and the proper head cement. The seam formed by the tying can be removed by fluffing with the fingers.

DETAILED DESCRIPTION OF THE INVENTION

Figure 1:
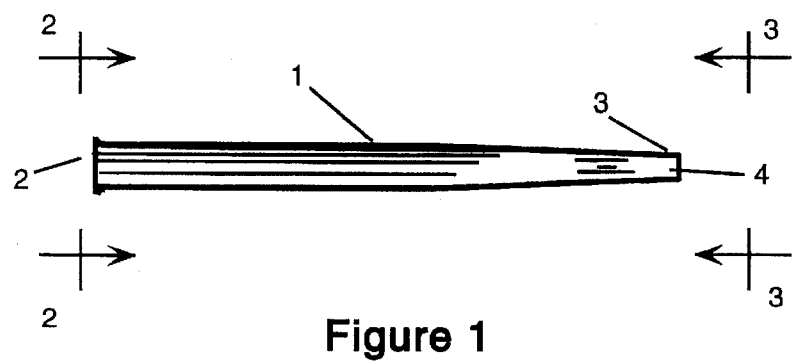
FIG. 1 is a side view of the tapered tube.
Figure 2:
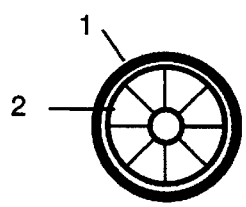
FIG. 2 is a back view of the of the tapered tube along the lines 2—2.
Figure 3:
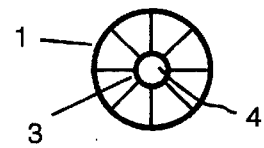
FIG. 3 is a front view of the tapered tube, taken along the lines 3—3.

Referring now to FIG. 1, the tapered tube 1 is shown. The tube 1 is made of clear plastic. The tube 1 has an open top 2 and is tapered to a tip 3 as shown. FIG. 2 shows the open top 2 of the tube 1. FIG. 3 shows the tip 3 of the tube 1. The tip 3 has an exit hole 4 formed in it to allow yarn 5 to be pulled through the tube 1. Four sizes of exit hole 4 are contemplated: ⅛ inch, 5/32 inch, 3/16 inch and ¼ inch. The size of the tube 1 is adjusted accordingly. For example, one model may have an exit hole 4 diameter of 5/32 inches, an overall length of 1¾ inches, an open top 2 diameter of ¼ inches and a wall thickness of 1/32 inches. These dimensions are representative and are not intended to be limiting.

Figure 4:
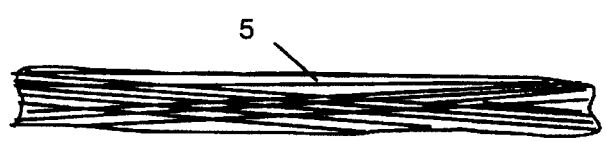
FIG. 4 is a side view of a typical swatch of yarn.
Figure 5:
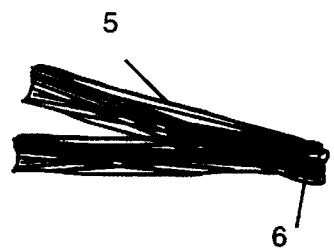
FIG. 5 is a side view of the yarn folded in half, ready for insertion into the tube.
Figure 6:
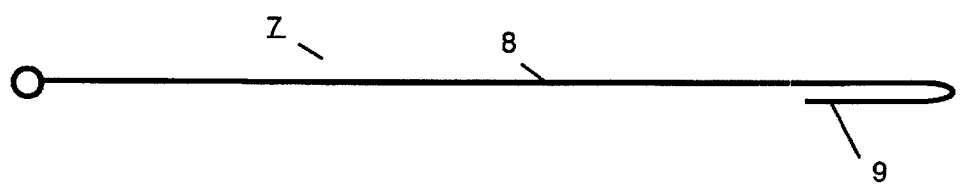
FIG. 6 is a side view of a hook tool used to pull the yarn through the tip of the tube.

FIG. 4 shows a typical swatch of the yarn 5. Note that before the yarn 5 is inserted into the tube 1, it is folded over in half, forming a loop 6 at one end. This is shown in FIG. 5. FIG. 6 shows a hook tool 7 that is used to pull the yarn 5 through the hole 4 in the tip 3. The hook tool 7 has a thin shaft 8 and a hook 9 as shown. The hook tool 7 is pushed into the tube 1 through the exit hole 4. The hook 9 is pushed through first. The hook 9 is pushed through tube 1 until it exits through the open top 2. The folded yarn 5 is then placed on the hook tool 7, by passing the loop 6 over the hook 9. The hook tool 7 is then pulled back through the tip 3 with the folded yarn 5 until a sufficient quantity of yarn 5 extends from the tip 3. See FIG. 7.

Figure 7:
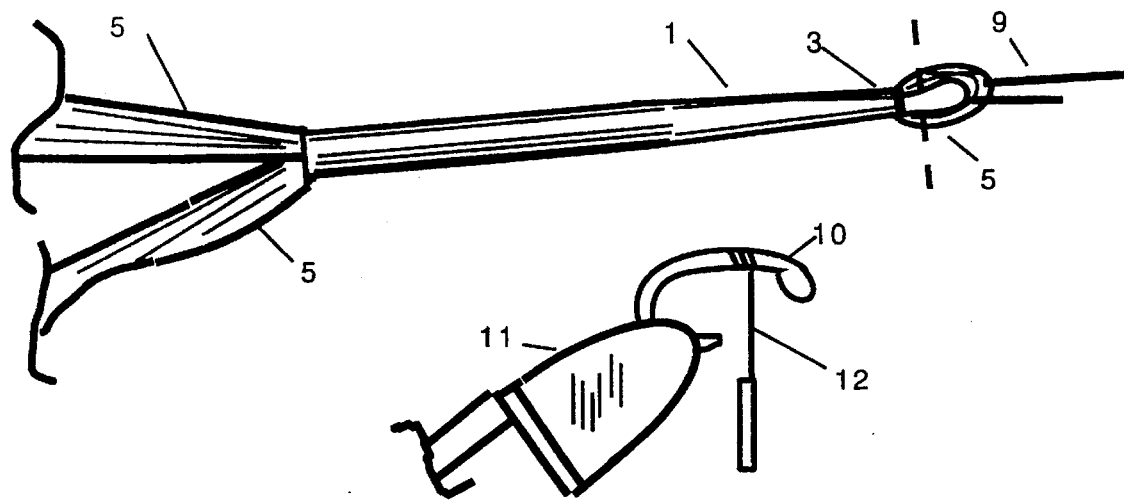
FIG. 7 is a detail view of the first step in the egg tying process.

Referring now to FIG. 7-12, the process of tying a fly using the tapered tube 1 is discussed. FIG. 7 shows the beginning of the process. Once a quantity of yarn 5 has been pulled from the tip 3, it is then cut back to a point about ¼ to ⅜ inches from the tip 3 of the tube 1 (see the dashed line). FIG. 7 also shows a suitable fish hook 10 placed in a fly tying vise 11. A quantity of thread 12 is started on the hook 10 in a manner common to the art.

Figure 8:
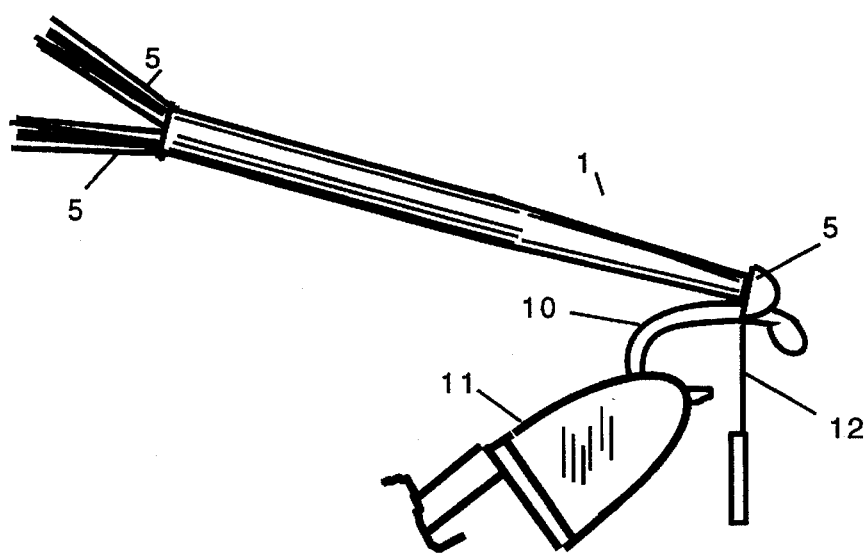
FIG. 8 is a detail view of the second step in the egg tying process.
Figure 9:
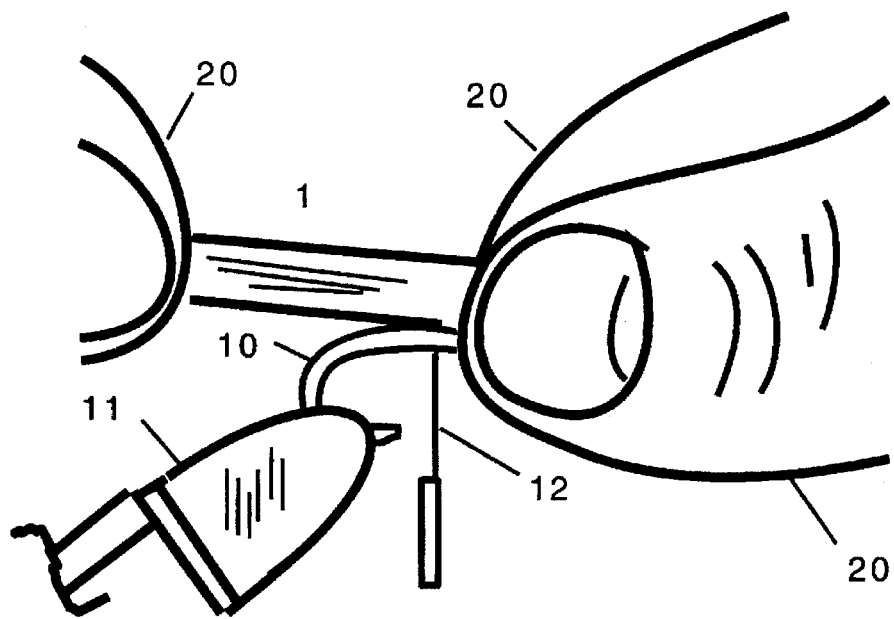
FIG. 9 is a detail view of the third step in the egg tying process.
Figure 10:
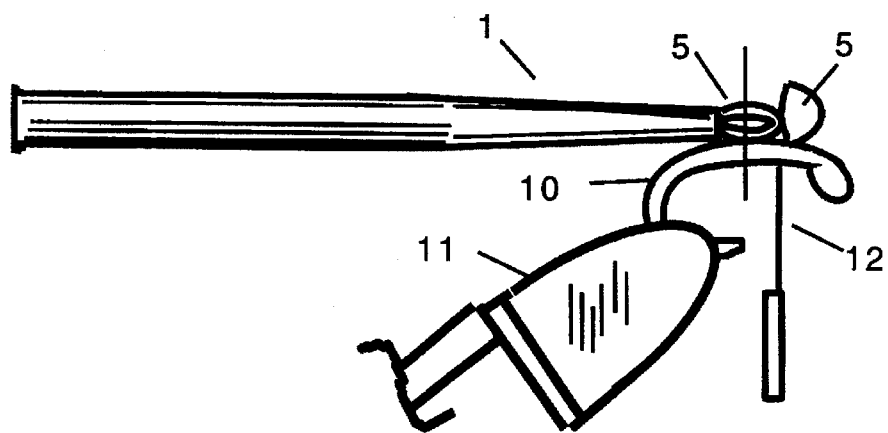
FIG. 10 is a detail view of the fourth step in the egg tying process.
Figure 11:
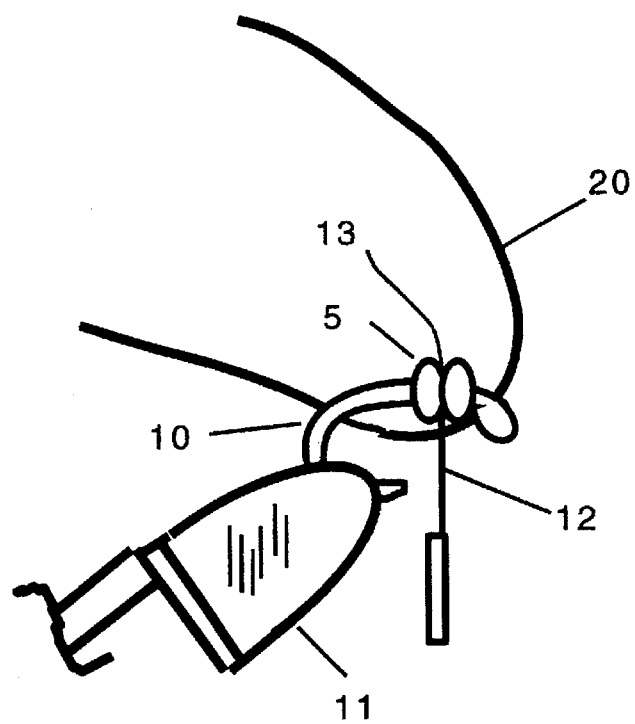
FIG. 11 is a detail view of the fifth step in the egg tying process.
Figure 12:
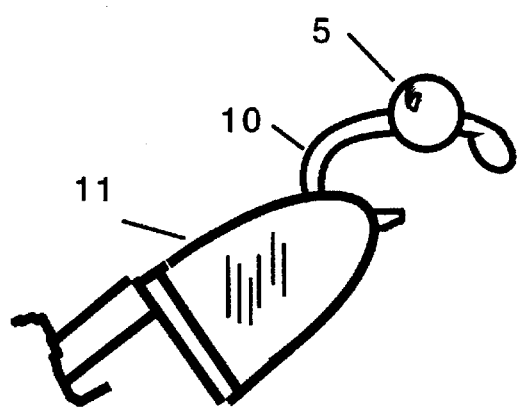
FIG. 12 is detail view of the completed lure.

Referring now to FIG. 8, the tip 3 of the tube 1 is then placed over the thread 12. The yarn 5 is then secured to the hook 10 with two wraps of thread 12, which are then tightened. Two additional wraps of thread 12 are made in front of the yarn 5 to hold the tension on the thread 12. Referring now to FIG. 9, the next step in the process is to pull back on the tube 1 while holding the yarn 5 on the fishing hook 10 using the user's fingers 20 The tube 1 is pulled back between ⅜ and ½ inches. Referring now to FIG. 10, the yarn 5 is cut at a point halfway between the tip 3 of the tube 1 and the thread 12. See the dashed line in the figure. Referring now to FIG. 11, while the user holds the yarn 5, with fingers 20, the thread 12 is unwrapped from the shank of the hook 10 and re-tightened. The yarn 5 is then secured to the hook 10 with two figure "8" patterns formed on the bottom of the egg pattern against the shank of the hook 10. Referring to FIG. 12, the thread 12 is secured to the hook 10 with two half hitches and the proper head cement. The seam 13 (see FIG. 11) formed by the thread 12 can be removed by fluffing with the fingers 20, leaving an overall rounded appearance.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. The method of tying an egg type fishing lure using a tube for holding a quantity of yarn, having a tip, and a hook tool for extracting a small quantity of said quantity of yarn from said tube, a fishing hook, thread, cement, and a fly tying vise comprising the steps of:

a) mounting an appropriate sized fishing hook into said fly tying vise;

b) loading the tube with said quantity of yarn;

c) extracting a small quantity of yarn from the tube using said hook tool;

d) cutting back the extracted small quantity of yarn to a point near the tip of the tube;

e) placing the tip of the tube over the thread on the fishing hook such that the small quantity of yarn is in contact with the fishing hook;

f) securing the yarn to the fishing hook with thread; and g) securing the thread to the fish hook.

2. The method of tying an egg type fishing lure using a tube for holding a quantity of yarn, having a tip, and a hook tool for extracting a small quantity of said yarn from said tube, a fishing hook, thread, cement, and a fly tying vise comprising the steps of:

a) mounting an appropriate sized fishing hook into said fly tying vise;

b) preparing the fishing hook with thread;

c) loading the tube with a quantity of yarn;

d) extracting a small quantity of yarn from the tube using said hook tool;

e) cutting back the extracted yarn to a point near the tip of the tube;

f) placing the tip of the tube over the thread on the fishing hook such that the small quantity of yarn is in contact with the fishing hook;

g) securing the small quantity of yarn to the fishing hook with two wraps of thread;

h) tightening the two wraps of thread;

i) placing two additional wraps of thread in front of the small quantity of yarn on said fishing hook to hold the tension on the thread;

j) pulling back on the tube while holding the small quantity of yarn on the fishing hook such that an additional quantity of yarn is extracted from the tip of the tube;

k) cutting the additional quantity of yarn at a point halfway between the tip of the tube and the thread;

l) securing the small quantity of yarn to the fishing hook with the thread; and m) securing the thread to the fishing hook.

* * * * *